(12) United States Patent
Hirasawa et al.

(10) Patent No.: US 6,932,902 B2
(45) Date of Patent: Aug. 23, 2005

(54) HYDRAULIC OIL FILTRATION APPARATUS

(75) Inventors: Shin-ichi Hirasawa, Kanagawa (JP); Yukio Adachi, Kanagawa (JP); Takeshi Yoshitome, Kanagawa (JP)

(73) Assignee: WAKO Industrial Co Ltd, Tokyo (JP)

( * ) Notice: Subject to any disclaimer, the term of this patent is extended or adjusted under 35 U.S.C. 154(b) by 7 days.

(21) Appl. No.: 10/724,338

(22) Filed: Nov. 28, 2003

(65) Prior Publication Data
US 2004/0108258 A1 Jun. 10, 2004

(30) Foreign Application Priority Data
Dec. 4, 2002 (JP) ........................................ 2002-352048

(51) Int. Cl.[7] .............................................. B01D 29/50
(52) U.S. Cl. ........................ 210/168; 210/258; 210/335; 210/416.5
(58) Field of Search ................................ 210/167, 168, 210/252, 258, 322, 335, 416.1, 443, 416.5, 444

(56) References Cited

U.S. PATENT DOCUMENTS

| | | | | |
|---|---|---|---|---|
| 3,262,564 A | * | 7/1966 | Silverwater et al. | 210/90 |
| 3,335,863 A | * | 8/1967 | Silverwater | 210/90 |
| 4,850,498 A | * | 7/1989 | Taylor | 210/651 |
| 6,063,269 A | * | 5/2000 | Miller et al. | 210/167 |

* cited by examiner

Primary Examiner—Fred G. Prince
(74) Attorney, Agent, or Firm—Robert W. J. Usher (57) ABSTRACT

A hydraulic oil filtration apparatus 40 comprises an actuation control valve V, a pump-pressure oil passage 41, a connection oil passage 43, a tank oil passage 51, a return filter 60, a drain oil passage 53, a drain filter 70 and an aspirator structure 90. The actuation control valve V controls to charge and discharge a hydraulic actuator A such as a boom cylinder 22 and travel motors with hydraulic oil from a hydraulic pump P, which is connected through the pump-pressure oil passage 41 to the actuation control valve V The hydraulic actuator A is connected with the actuation control valve V by the connection oil passage 43, and the actuation control valve V is connected to a tank T by the tank oil passage 51, in which the return filter 60 is provided. The part of the tank oil passage 51 downstream with respect to the return filter 60 is connected to the hydraulic pump P by the drain oil passage 53, in which the drain filter 70 is provided. The aspirator structure 90 is positioned at the junction between the tank oil passage 51 and the drain oil passage 53, so that leakage oil in the drain oil passage 53 is drawn by the flow of the discharged oil through the tank oil passage 51 and led to the drain filter 70.

8 Claims, 7 Drawing Sheets

HYDRAULIC OIL FILTRATION APPARATUS

RELATED APPLICATIONS

This application claims the priority of Japanese Patent Application No. 2002-352048 filed on Dec. 4, 2002 the disclosure of which is incorporated herein by reference.

FIELD OF THE INVENTION

The present invention relates to a hydraulic oil filtration apparatus. More particularly, the invention relates to a hydraulic oil filtration apparatus that cleans oil discharged from hydraulic actuators used as drives in industrial equipment and oil leaked from a hydraulic pump and from the hydraulic actuators.

BACKGROUND OF THE INVENTION

Figure 7:
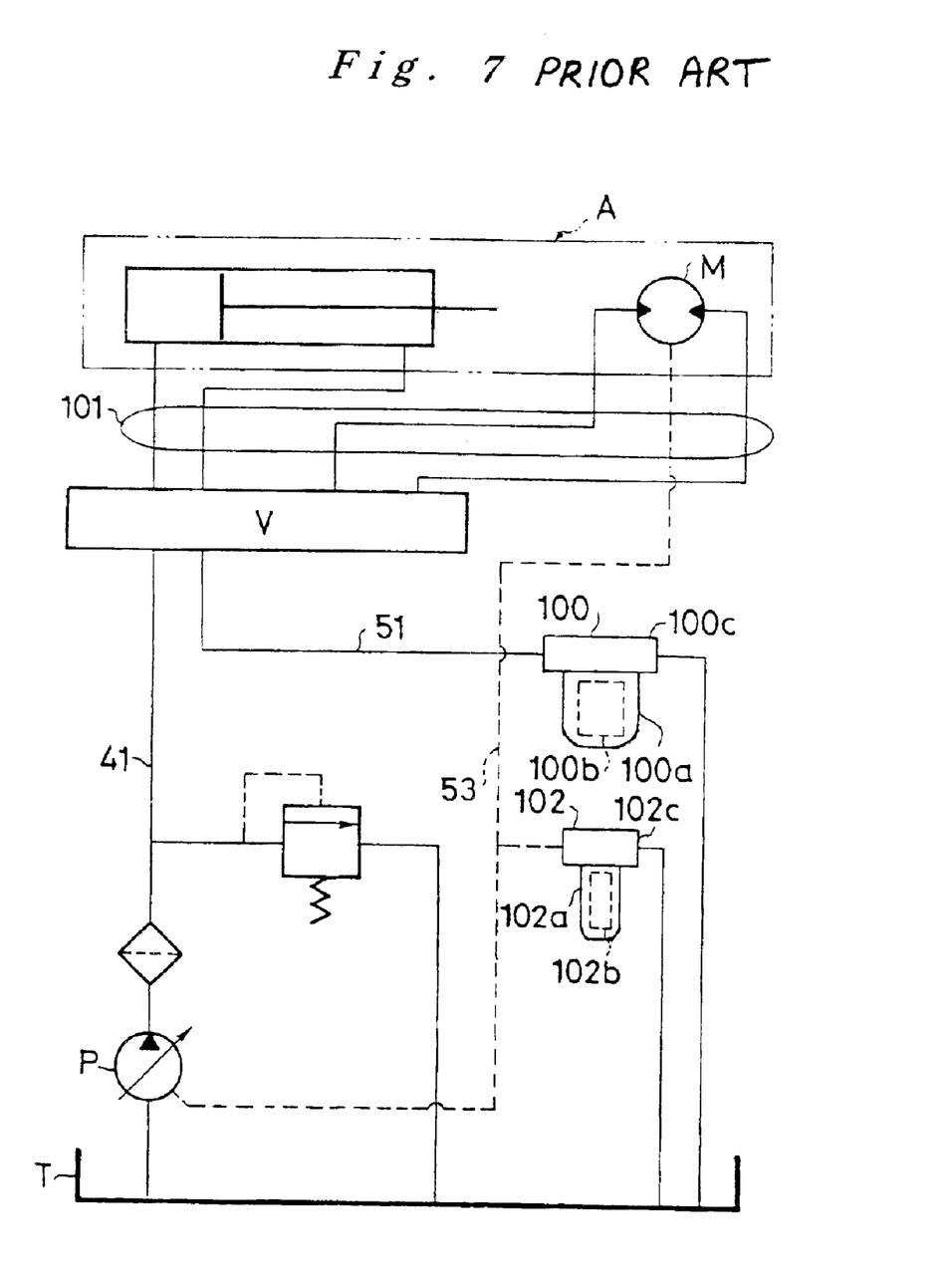
FIG. 7 is a hydraulic circuit diagram of a conventional hydraulic oil filtration apparatus.

Such a hydraulic oil filtration apparatus is conventionally constructed, for example, as shown in FIG. 7. This apparatus comprises a hydraulic actuator A, a hydraulic pump P, an actuation control valve V, a pump-pressure oil passage 41, a connection oil passage 101, a tank oil passage 51, a return filter 100, a drain oil passage 53 and a drain filter 102. The hydraulic actuator A functions as a drive in an assembly of industrial equipment, which is mounted on a vehicle, and the actuation control valve V controls to charge and discharge the hydraulic actuator A with hydraulic oil delivered by the hydraulic pump P The pump-pressure oil passage 41 leads the hydraulic oil discharged from hydraulic pump P to the actuation control valve V, and the connection oil passage 101 is positioned between the hydraulic actuator A and the actuation control valve V, to let the hydraulic oil move therebetween for the actuation of the hydraulic actuator A. The tank oil passage 51 connects the actuation control valve V to a tank T to lead the hydraulic oil that is discharged from the hydraulic actuator A during the actuation thereof, through the connection oil passage 101 and the actuation control valve V The return filter 100 is positioned in the tank oil passage 51 to clean the oil discharged from the hydraulic actuator A. The drain oil passage 53 connects a hydraulic motor M constituting the hydraulic actuator A to the hydraulic pump P and thereby to the tank T to return oil that has leaked from the hydraulic pump P and the hydraulic motor M, to the tank T. The drain filter 102 is positioned in the drain oil passage 53 to clean the oil that has leaked from the hydraulic pump P and the hydraulic motor M.

The return filter 100 of the hydraulic oil filtration apparatus comprises a return casing 100a, a return filter element 100b and a return head 100c. The return casing 100a is a container with an upper opening and accommodates the return filter element 100b, and the return head 100c is mounted removably to cover the opening of the casing 100a. Also, the drain filter 102 comprises a drain casing 102a, a drain filter element 102b and a drain head 102c in the same manner as the return filter 100. The drain casing 102a is a container with an upper opening and accommodates the drain filter element 102b, and the drain head 102c is mounted removably to cover the drain casing 102a.

In this hydraulic oil filtration apparatus, oil that has been discharged in the actuation of the hydraulic actuator A passes through the connection oil passage 101, the actuation control valve V and the tank oil passage 51, where the oil is cleaned by the return filter 100, and the oil returns to the tank T. On the other hand, oil that has leaked from the hydraulic motor M and the hydraulic pump P passes through the drain oil passage 53, where the oil is cleaned by the drain filter 102, and the oil returns to the tank T.

Because the amount of the oil that leaks from the hydraulic pump and the hydraulic motor is small as compared with the amount of the oil that is discharged in the actuation of the hydraulic actuator, the amount of the leakage oil that is cleaned by the drain filter and returned to the tank is also small. Here, if the leakage oil that has passed through the drain filter 102 is directed into the tank oil passage 51, which leads from the return filter 100 to the tank, then the material for constructing the oil passages can be economized. However, if the apparatus were arranged in this manner, then it would present a problem of the oil passing through the return filter 100 flowing into the drain filter 102, resulting in an impairment of the function of the drain filter 102.

Furthermore, when the filter elements of the return filter and the drain filter are to be replaced, it is necessary to remove the return casing from the return head for the replacement of the return filter element together with the return casing as well as to remove the drain casing from the drain head for the replacement of the drain filter element together with the drain casing. In a case where the return filter and the drain filter are provided independently away from each other, a worker, after replacing one of the filters, must move to the location where the other filter is installed before engaging in the replacement of the other filter. This is a problem that impairs the efficiency of the replacement work.

SUMMARY OF THE INVENTION

To solve these problems, it is an object of the present invention to provide a hydraulic oil filtration apparatus that facilitates the ease of the replacement of filter elements.

Another object of the present invention is to provide a hydraulic oil filtration apparatus that enables its piping leading to a filter to be used commonly for discharged oil and leakage oil, thereby economizing piping material and achieving simplicity in construction and cost effectiveness.

A hydraulic oil filtration apparatus according to the present invention comprises a hydraulic apparatus (for example, the power-shovel unit 20 described in the following embodiment), a first filter (for example, the return filter 60 described in the following embodiment), a second filter (for example, the drain filter 70 described in the following embodiment), a first downstream discharge oil passage, a second downstream discharge oil passage, an aspirator structure and a joined discharge oil passage. The first filter filters hydraulic oil discharged from the hydraulic apparatus while the second filter filters hydraulic oil leaked from the hydraulic apparatus. The hydraulic oil filtered by the first filter is led tank-ward by the first downstream discharge oil passage while the hydraulic oil filtered by the second filter is led tank-ward by the second downstream discharge oil passage. These first and second downstream discharge oil passages are connected by the aspirator structure to join the hydraulic oil discharged from the first filter and the hydraulic oil discharged from the second filter, and the hydraulic oil joined by the aspirator structure is returned to the tank by the joined discharge oil passage. In this case, the aspirator structure draws the hydraulic oil flowing in through the second downstream discharge oil passage by the flow of the hydraulic oil flowing in through the first downstream discharge oil passage, and the aspirator structure joins these flows.

In this filtration apparatus, the aspirator structure comprises a main oil passage, which leads the hydraulic oil coming in through the first downstream discharge oil passage, and a minor oil passage, which is open toward the downstream side of the main oil passage and, through this opening, leads the hydraulic oil coming in through the second downstream discharge oil passage into the main oil passage. In the aspirator structure, the flow of the hydraulic oil passing through the main oil passage draws the hydraulic oil flowing through the minor oil passage into the main oil passage, joining these flows of hydraulic oil into a unified flow.

Furthermore, the above mentioned hydraulic apparatus comprises a hydraulic actuator, a hydraulically actuated device, which is actuated by the hydraulic actuator, a hydraulic pump and an is actuation control valve, which controls to charge and discharge the hydraulic actuator of the hydraulically actuated device with hydraulic oil delivered from the hydraulic pump. In this filtration apparatus, the oil that has been discharged in the actuation of the hydraulic actuator is filtered by the first filter while the oil that has leaked from at least one of the hydraulic pump and the hydraulic actuator is filtered by the second filter.

According to this hydraulic oil filtration apparatus, the hydraulic oil filtered by the first filter and the hydraulic oil filtered by the second filter are joined by the aspirator structure, which connects the first downstream discharge oil passage and the second downstream discharge oil passage, and returned to the tank through the joined discharge oil passage. Unlike a conventional filtration apparatus, it is not necessary to provide discharge oil passages separately and independently for the hydraulic oil filtered by the first filter and for the hydraulic oil filtered by the second filter, for returning the hydraulic oil to the tank. Therefore, the hydraulic oil filtration apparatus according to the present invention is relatively simple and inexpensive.

In this filtration apparatus, preferably, the first filter comprises a first casing, which is a container with an upper opening, a first filter element, which is accommodated and retained in the first casing, and a first head, which is attached removably to cover the upper opening of the first casing. Also, preferably, the second filter comprises a second casing, which is a container with an upper opening, a second filter element, which is accommodated and retained in the second casing, and a second head, which is attached removably to cover the upper opening of the second casing. Furthermore, it is preferable that the first head and the second head be constructed as a unified head, in which the aspirator structure is provided.

By unifying the first head and the second head, the first filter and the second filter are installed close to each other. This arrangement of the hydraulic oil filtration apparatus improves the ease and the efficiency of the filter-element replacement work significantly because the fist and second casings are easily removed from the unified first and second heads when the fist and second filter elements are to be replaced together. In addition, because the aspirator structure is provided in the unified head, the filtration apparatus as a whole is simple and compact in design.

According to another aspect of the present invention, a hydraulic oil filtration apparatus comprises a hydraulic apparatus, a first upstream discharge oil passage, a second upstream discharge oil passage, an aspirator structure, a filter and a joined discharge oil passage. The first upstream discharge oil passage leads hydraulic oil that has been discharged from the hydraulic apparatus while the second upstream discharge oil passage leads hydraulic oil that has leaked from the hydraulic apparatus. The first and second upstream discharge oil passages are joined by the aspirator structure to combine the hydraulic oil discharged from the hydraulic apparatus and the hydraulic oil leaked from the hydraulic apparatus, and the hydraulic oil that has been combined at the aspirator structure is then filtered by the filter and returned to the tank through the joined discharge oil passage. In the aspirator structure, it is the flow of the hydraulic oil passing through the first upstream discharge oil passage that draws hydraulic oil from the second upstream discharge oil passage and creates a joined flow of discharged oil and leaked oil.

In this case, the aspirator structure comprises a main oil passage, which leads the hydraulic oil coming in through the first upstream discharge oil passage, and a minor oil passage, which is open toward the downstream side of the main oil passage and, through this opening, leads the hydraulic oil coming in through the second upstream discharge oil passage into the main oil passage. In this aspirator structure, the flow of the hydraulic oil passing through the main oil passage draws the hydraulic oil in the minor oil passage into the main oil passage to create a unified flow.

Preferably, the above mentioned hydraulic apparatus comprises a hydraulic actuator, a hydraulically actuated device, which is actuated by the hydraulic actuator, a hydraulic pump and an actuation control valve, which controls to charge and discharge the hydraulic actuator of the hydraulically actuated device with hydraulic oil delivered by the hydraulic pump. Also, preferably, the oil that has been discharged in the actuation of the hydraulic actuator is led into the first upstream discharge oil passage while the oil that has leaked from at least one of the hydraulic pump and the hydraulic actuator is led into the second upstream discharge oil passage.

According to this hydraulic oil filtration apparatus, the hydraulic oil coming through the first upstream discharge oil passage and the hydraulic oil coming through the second upstream discharge oil passage are combined by the aspirator structure, and this combined hydraulic oil is then filtered and returned to the tank through the joined discharge oil passage. As a result, the oil discharged and the oil leaked from the hydraulic apparatus is cleaned by a single filter and returned to the tank by a single passage, i.e., the joined discharge oil passage. Therefore, clearly, the number of tubes used as passages in the filtration apparatus is smaller than that of a prior-art filtration apparatus. Because of this and the use of only a single filter, this hydraulic oil filtration apparatus is relatively simple and inexpensive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
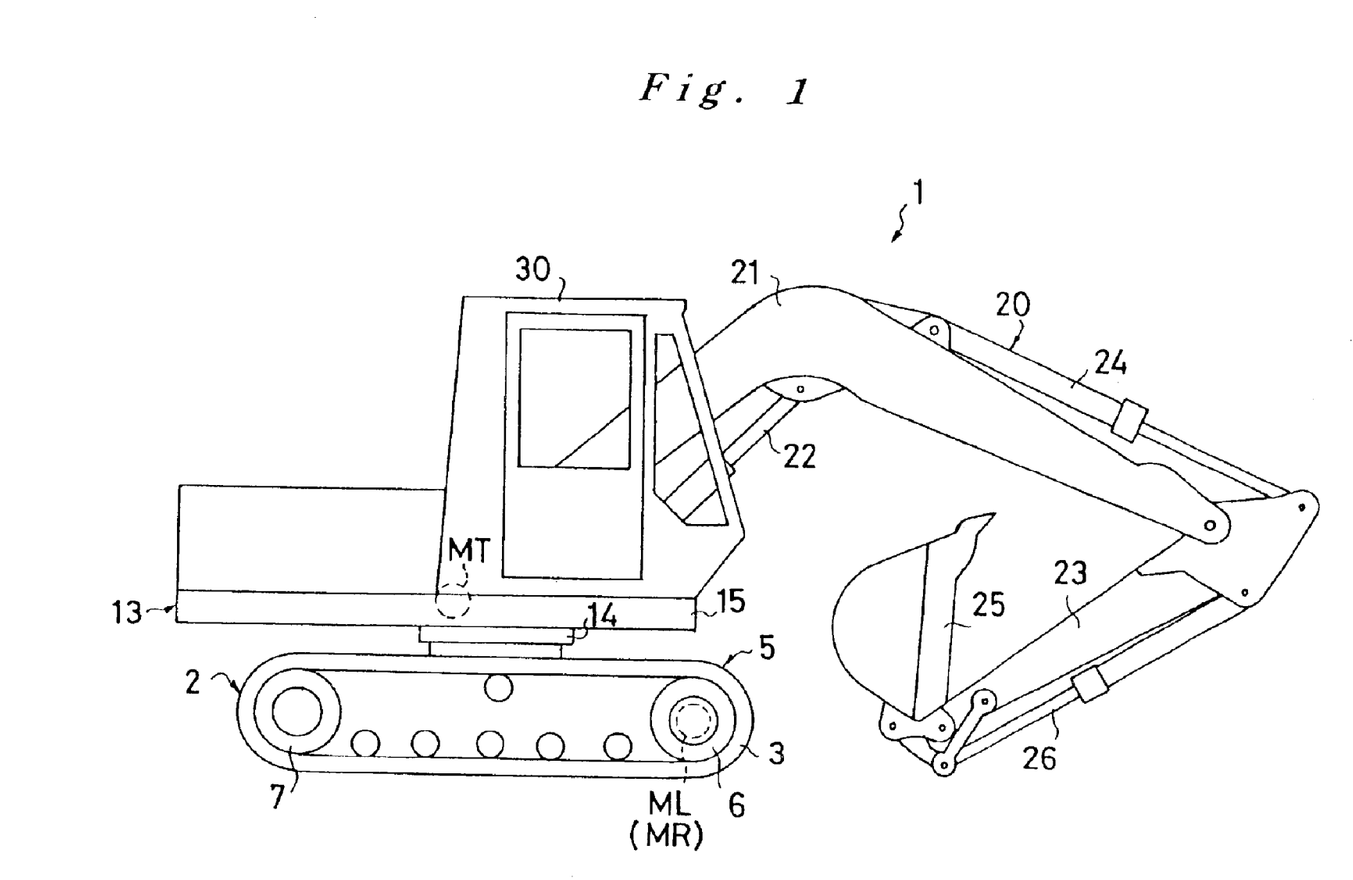
FIG. 1 is a side view of a work vehicle, in which a hydraulic oil filtration apparatus is incorporated as an embodiment according to the present invention.

Now, a preferred embodiment according to the present invention is described in reference to FIG. 1~FIG. 6. Before the description of an hydraulic oil filtration apparatus according to the present invention, a representative example of work vehicle which incorporates a hydraulic oil filtration apparatus is described. This work vehicle 1 comprises, as shown in FIG. 1, a truck 2, a swivel base 13, a power-shovel unit 20 and an operator cabin 30. The truck 2 is equipped with a pair of right and left travelling gears 5 with endless belts 3, and the swivel base 13 is provided on the truck 2 to turn the power-shovel unit 20 and the operator cabin 30, which are positioned at the front upper part of the swivel base 13.

Each of the travelling gears 5 comprises a drive wheel 6 and a driven wheel 7, which are positioned at a predetermined distance from each other in the longitudinal direction of the vehicle. Each travelling gear further comprises the above mentioned endless belt 3, which is disposed around the drive wheel 6 and the driven wheel 7 and moves around them in correspondence to the rotation of the drive wheel 6, and each of the right and left drive wheels 6 is connected to a travel motor MR or ML, respectively. The swivel base 13 comprises a swivel device 14, which is mounted on the truck 2, and a swivel plate 15, which is mounted on the swivel device 14 at the upper part thereof. The swivel device 14 is equipped with a swivel motor MT, which drives the swivel plate 15 to swivel horizontally. The power-shovel unit 20 comprises a boom 21, an arm 23 and a bucket 25. The boom 21, whose base end is pivoted at the front end of the swivel base 13, is capable of being swung upward and downward, and the arm 23, whose one end is pivoted at the front end of the boom 21, is also capable of being swung upward and downward. In addition, the bucket 25 is also pivoted at the front end of the arm 23 and is capable of being swung upward and downward. The boom 21 is raised or lowered by the actuation of a boom cylinder 22, which is pivoted at the front end of the swivel base 13 and at the lower side of the boom 21. The arm 23 is bent or stretched by the actuation of an arm cylinder 24, which is pivoted at the upper side of the boom 21 and at the base part of the arm 23. The bucket 25 is swiveled upward and downward by the actuation of a bucket cylinder 26, which is pivoted at the upper side of the arm 23 and at the base part of the bucket 25.

The operator cabin 30 incorporates a shovel-manipulation device (not shown), which is used to operate the power-shovel unit 20 and the swivel base 13, and a travel-operation device (not shown), which is used to operate the right and left pair of travelling gears 5. The shovel-manipulation device comprises a plurality of manipulation levers (not shown), which are slanted, respectively, to raise or lower the boom 21, to bend or stretch the arm 23, to swing the bucket 25 upward or downward, and to swivel the swivel base 13 laterally rightward or leftward. The travel-operation device comprises a plurality of operation levers (not shown), which are also slanted, respectively, to rotate the drive wheels 6 in a normal direction or in an opposite direction.

Figure 2:
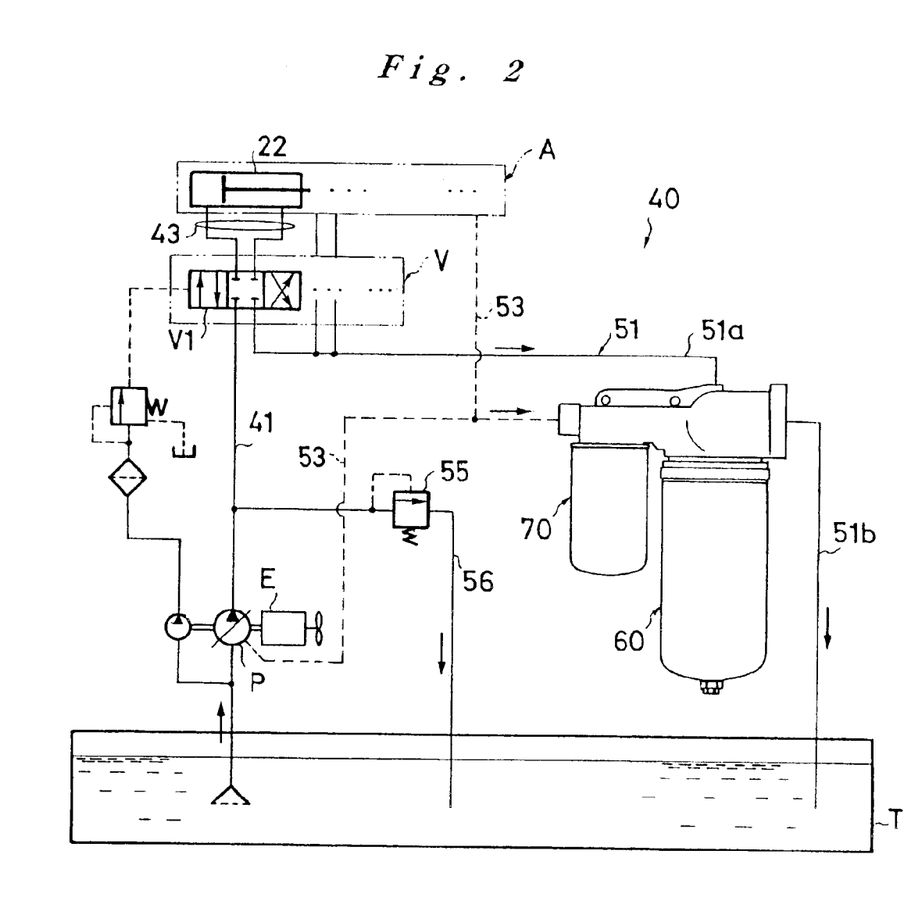
FIG. 2 is a hydraulic circuit diagram of a hydraulic oil filtration apparatus as an embodiment according to the present invention.
Figure 3:
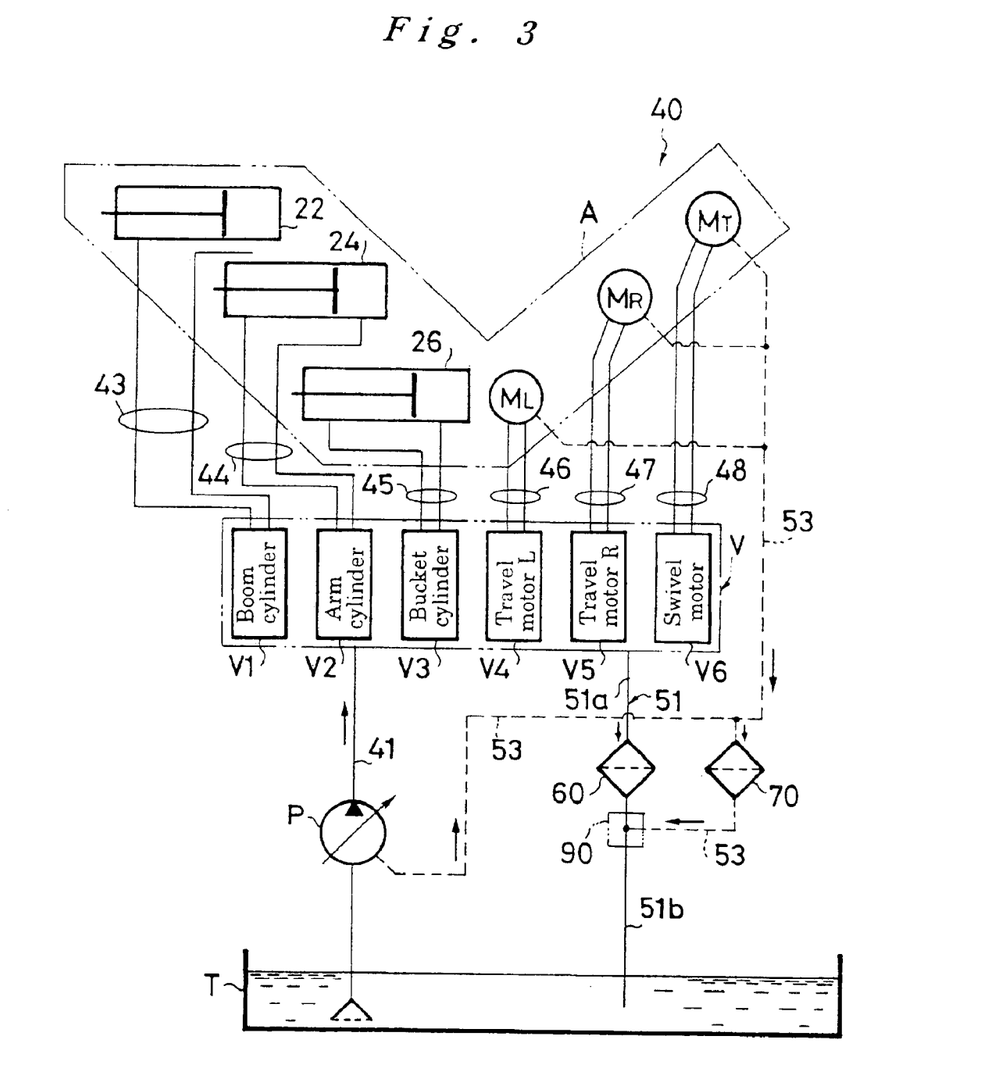
FIG. 3 is a schematic diagram of a hydraulic circuit for a hydraulic oil filtration apparatus as an embodiment according to the present invention.

Now, a description is given of a hydraulic oil filtration apparatus according to the present invention, which apparatus is incorporated in the above described work vehicle 1. As shown in FIG. 2 and FIG. 3, the hydraulic oil filtration apparatus 40 comprises the travelling gears 5 with the drive motors MR and ML, the swivel device 14 with the swivel motor MT, and the power-shovel unit 20 with the boom cylinder 22, the arm cylinder 24 and the bucket cylinder 26 as shown in FIG. 1. Hereinafter, the travel motors MR and ML, the swivel motor MT, the boom cylinder 22, the arm cylinder 24 and the bucket cylinder 26 are all together referred to as "hydraulic actuator A".

Furthermore, the hydraulic oil filtration apparatus 40 comprises a hydraulic pump P, an actuation control valve V, a pump-pressure oil passage 41, connection oil passages 43~48, a tank oil passage 51, a return filter 60, a drain oil passage 53, a drain filter 70 and an aspirator structure 90. The hydraulic pump P is a variable delivery pump, and the actuation control valve V controls to charge or discharge the hydraulic actuator A with hydraulic oil delivered by the pump P. The pump-pressure oil passage 41 is used to lead the hydraulic oil delivered by the pump P to the actuation control valve V, and the connection oil passages 43~48 are positioned between the hydraulic actuator A and the actuation control valve V for letting the hydraulic oil move therebetween, and the tank oil passage 51 connects the actuation control valve V to a tank T to lead the hydraulic oil discharged from the hydraulic actuator A during the actuation thereof, through the connection oil passages 43~48 and the actuation control valve V to the tank T. The return filter 60 is positioned in the tank oil passage 51 to clean the oil discharged from the hydraulic actuator A, and the drain oil passage 53 connects the hydraulic pump P, the travel motors MR and ML and the swivel motor MT to the tank oil passage 51 to return the oil that has leaked from the hydraulic pump P, the travel motors MR and ML and the swivel motor MT. The drain filter 70 is positioned in the drain oil passage 53 to clean the oil that has leaked from the hydraulic pump P, the travel motors MR and ML and the swivel motor MT, and the aspirator structure 90 is positioned at a junction between the tank oil passage 51 and the drain oil passage 53.

The hydraulic pump P, which is driven rotationally by an engine E incorporated in the vehicle, supplies oil, which is pooled in the tank T, to the pump-pressure oil passage 41. This oil passage is connected with a relief oil passage 56 where a relief valve 55 is provided to release some oil in the pump-pressure oil passage 41 to the tank T and thereby reduce the pressure to a value below a predetermined pressure in case where the pressure happens to become higher than the predetermined pressure. The actuation control valve V comprises electromagnetic direction-switching valves, each is connected through a connection oil passage to a corresponding constituent of the hydraulic actuator A, i.e., as shown in FIG. 3, a boom-actuation control valve V1, which controls the actuation of the boom cylinder 22, an arm-actuation control valve V2, which controls the actuation of the arm cylinder 24, a bucket-actuation control valve V3, which controls the actuation of the bucket cylinder 26, travel-actuation control valves V4 and V5, which control the actuation of the travel motors ML and MR, respectively, and a swivel-actuation control valve V6, which controls the actuation of the swivel motor MT. The boom-actuation control valve V1 is connected to the boom cylinder 22 through a connection oil passage 43, and the arm-actuation control valve V2 is connected to the arm cylinder 24 through a connection oil passage 44. The bucket-actuation control valve V3 is connected to the bucket cylinder 26 through a connection oil passage 45, and the travel-actuation control valves V4 and V5 are connected to the travel motors ML and MR through connection oil passages 46 and 47, respectively. The swivel-actuation control valve V6 is connected to the swivel motor MT through a connection oil passage 48.

The actuation control valve V is driven to control the actuation of the hydraulic actuator A in correspondence to the manipulation of the shovel-manipulation device and the travel-operation device, which are mentioned above. The tank oil passage 51, whose downstream end is connected to the tank T, is branched upstream in plurality, and each branch is connected to a corresponding constituent of the actuation control valve V Hereinafter, the upstream part of the tank oil passage 51 above the return filter 60 is referred to as "upstream tank oil passage 51a" while the downstream part below the return filter 60 is referred to as "downstream tank oil passage 51b". The upstream ends of the drain oil passage 53 are connected, respectively, to the casings of the hydraulic pump P, the travel motors MR and ML and the swivel motor MT to collect the oil that has leaked therefrom to the drain oil passage 53, and the downstream end of the drain oil passage 53 is connected with the downstream tank oil passage 51b of the tank oil passage 51, where the return filter 60 is provided.

Figure 4A:
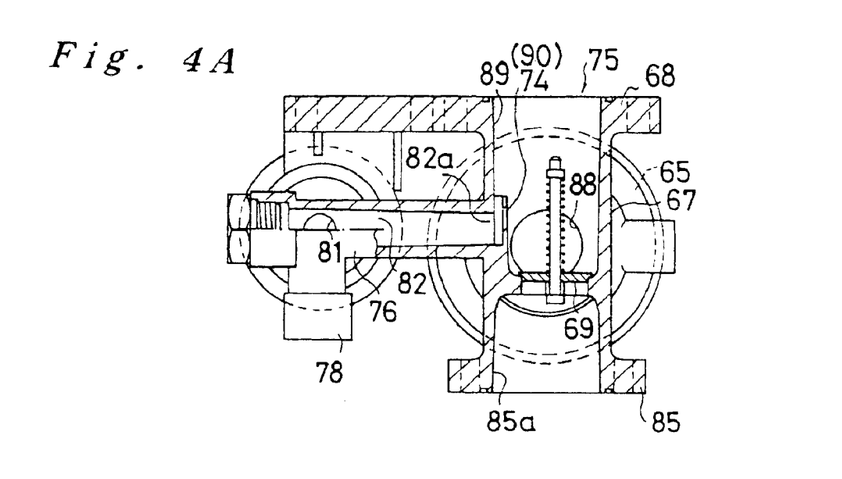
FIGS. 4A and 4B show a return filter and a drain filter as embodiments according to the present invention, FIG. 4A being a top view of a common head and FIG. 4B being a front view of the return filter and the drain filter.
Figure 4B:
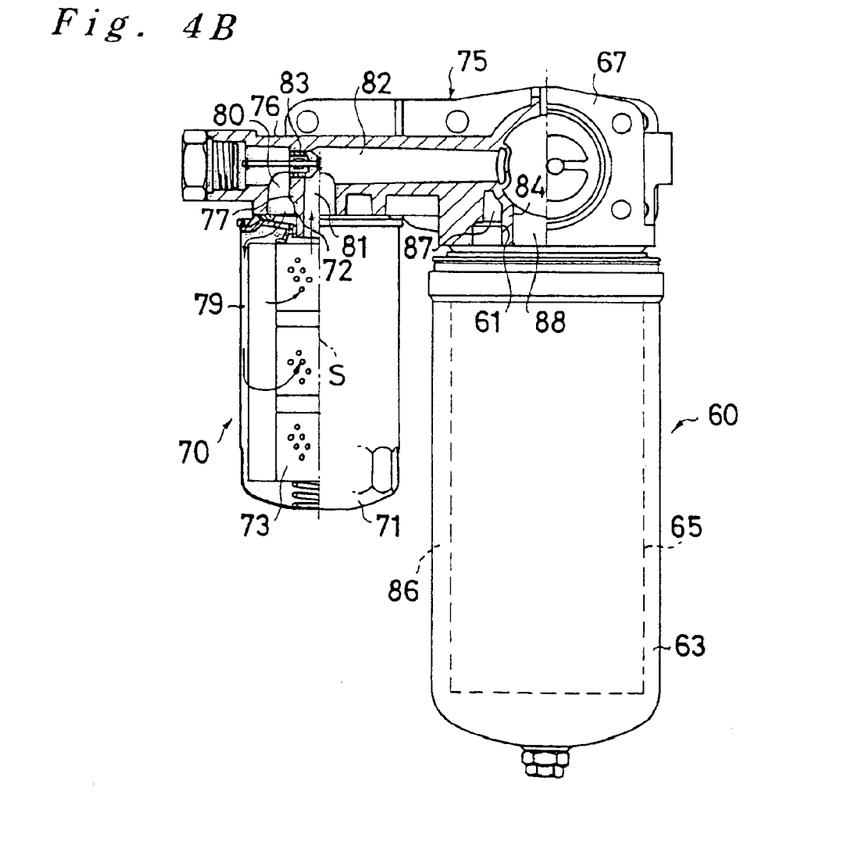

The drain filter 70 comprises a drain casing 71, a drain filter element 73 and a drain head portion 76 as shown in FIG. 4B. The drain casing 71 is a vertically positioned, bottom-closed tubular container with an upper opening 72 and accommodates the drain filter element 73, which also has a tubular figure with a closed bottom. The drain head portion 76 is part of a common head 75, which part covers the opening 72 of the drain casing 71 when the drain casing 71 is mounted in removably by means of threaded fixing provided at the upper end thereof. Likewise, the return filter 60 comprises a return casing 63, a return filter element 65 and a return head portion 67. The return casing 63 is a vertically positioned, bottom-closed tubular container with an upper opening 61 and accommodates the return filter element 65, which also has a tubular figure with a closed bottom. The return head portion 67 is part of the common head 75, which part covers the opening 61 of the return casing 63 when the return casing 63 is mounted in removably by means of threaded fixing provided at the upper end thereof.

The common head 75 is a unified component comprising the above mentioned drain head portion 76 and return head portion 67. Referring to FIG. 4A for details, the drain head portion 76 comprises an engaging portion 77, a drain port 78, a first connection passage 80, a second connection passage 81 and a third connection passage 82. The engaging portion 77 extends downward in a tubular form and engages removably the opening 72 of the drain casing 71, and the drain port 78 is positioned above the engaging portion 77, extending horizontally outward, to be connected to the drain oil passage 53 shown in FIG. 2. The first connection passage 80 connects a through-hole (not shown) provided through the drain port 78 to a clearance 79 between the outside of the drain filter element 73 and the inner face of the drain casing 71 when the opening 72 of the drain filter 70 is fixed in the engaging portion 77. The second connection passage 81 extends vertically in the engaging portion 77 to connect to the inner space of the drain filter element 73 to lead upward the oil that has passed through the drain filter element 73 from the outside to the inside thereof. The third connection passage 82 extends from the upper end of the second connection passage 81 horizontally to the return head portion 67. In addition, the drain head portion 76 is equipped with a drain relief valve 83, which functions to prevent the pressure of the first connection passage 80 from exceeding a predetermined pressure when the drain filter element 73 is clogged. The drain relief valve 83 is positioned between the first connection passage 80 and the third connection passage 82 and blocks the fluid communication through the first connection passage 80 and the third connection passage 82 while the pressure of the first connection passage 80 is below the predetermined pressure but opens the fluid communication when the pressure of the first connection passage 80 exceeds the predetermined pressure.

On the other hand, the return head portion 67 comprises an engaging portion 84, a first return port 85, a first connection passage 87, a second connection passage 88 and a third connection passage 89. The engaging portion 84 extends downward in a tubular form and engages removably the opening 61 of the return casing 63, and the first return port 85 is positioned above the engaging portion 84, extending horizontally outward, to be connected to the upstream tank oil passage 51a shown in FIG. 2. The first connection passage 87 connects a through-hole 85a provided through the first return port 85 to a clearance 86 between the outside of the return filter element 65 and the inner face of the return casing 63 when the return casing 63 is fixed in the return head portion 67. The second connection passage 88 extends vertically in the engaging portion 84 to connect to the inner space of the return filter element 65 to lead upward the oil that has passed through the return filter element 65 from the outside to the inside thereof. The third connection passage 89 extends from the upper end of the second connection passage 88 horizontally away from the first return port 85, and the third connection passage 89 is equipped with a second return port 68 at the outer end thereof, where the downstream tank oil passage 51b shown in FIG. 2 is connected.

In addition, the return head portion 67 is equipped with a return relief valve 69, which functions to prevent the pressure of the first connection passage 87 from exceeding a predetermined pressure when the return filter element 65 is clogged. The return relief valve 69 is positioned between the first connection passage 87 and the third connection passage 89 and blocks the fluid communication through the first connection passage 87 and the third connection passage 89 while the pressure of the first connection passage 87 is below the predetermined pressure but opens the fluid communication when the pressure of the first connection passage 87 exceeds the predetermined pressure.

The diameter of the third connection passage 82 provided at the drain head portion 76 decreases gradually as the third connection passage 82 nears the return head portion 67, and the third connection passage 82 is open to the base of the third connection passage 89 of the return head portion 67. In front of the opening 82a of the third connection passage 82, a vertically extending, inflow-restriction plate 74, which faces the opening, is provided with a predetermined clearance as shown in FIG. 4A. The inflow-restriction plate 74 restricts the inflow of the oil discharged upward from the central part of the return filter element 65 into the third connection passage 82, and it constitutes the aspirator structure 90 as shown in FIG. 4A, which functions as an aspirator to suck the oil in the third connection passage 82 of the drain head portion 76 when the discharged oil flows through the third connection passage 89 to the downstream tank oil passage 51b shown in FIG. 2.

Figure 5:
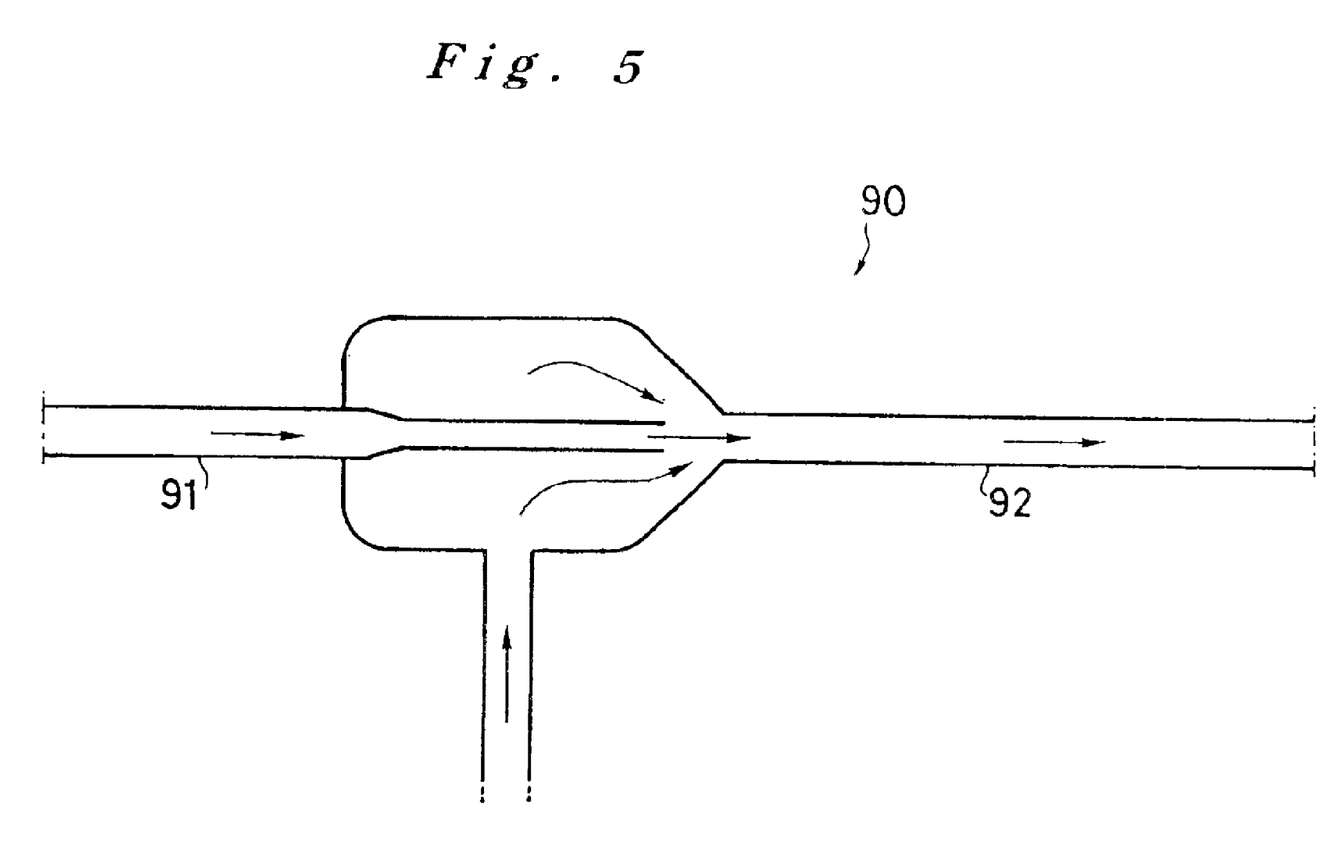
FIG. 5 is a schematic diagram describing an aspirator structure as an embodiment according to the present invention.

FIG. 5 is a schematic diagram describing the principle of the aspirator structure 90. As shown in the drawing, when a fluid flows rapidly through a first flow passage 91, which extends from the left side (the lower side in FIG. 5) to the right side (the upper side in FIG. 5), the condition surrounding a jet stream that is coming out of the first flow passage 91 becomes close to a vacuum. As a result, the other fluid that surrounds the first flow passage 91 is drawn to the jet stream, and the other fluid drawn in and the fluid in the jet stream, which is coming out of the first flow passage 91, flow together into a second flow passage 92.

Now, the operation of the hydraulic oil filtration apparatus 40, which incorporates the aspirator structure 90, is described. As shown in FIG. 2, the hydraulic oil delivered by the hydraulic pump P is led to the actuation control valve V, which controls to charge and discharge the hydraulic actuator A with the hydraulic oil. While the charge and discharge of the hydraulic actuator A is being controlled by the actuation control valve V, the hydraulic oil discharged in the actuation of the hydraulic actuator A flows through the connection oil passages 43~and the actuation control valve V to the upstream tank oil passage 51a and then flows through the through-hole 85a of the first return port 85 to the first connection passage 87 of the return filter 60 as shown in FIG. 4A. Then, as shown in FIG. 4A and FIG. 4B, the discharged oil flowing into the first connection passage 87 enters the clearance 86 in the return casing 63 and passes through the return filter element 65 from the out side to the inside thereof. When the discharged oil passes through the return filter element 65, foreign matters are removed from the discharged oil. The discharged oil after being cleaned is then led upward through the second connection passage 88 and then through the third connection passage 89 to the downstream tank oil passage 51b, which is connected to the second return port 68 as shown in FIG. 2.

Here, the oil discharged from the hydraulic actuator A shown in FIG. 3 flows out of the hydraulic actuator A when the hydraulic actuator A is actuated. Therefore, the flow of the discharged oil is substantial while the work vehicle 1 shown in FIG. 1 is being operated in doing some work, so the flow rate of the discharged oil through the return filter 60 is also substantial. As a result, as shown in FIG. 4, the flow rate at which the discharged oil that has been cleaned goes up from the central part of the return filter element 65 and passes through the third connection passage 89 is high enough to create a jet stream. This discharged oil flowing rapidly around the inflow-restriction plate 74, which functions as a principle member of the aspirator structure 90 as described above, sucks the leaked oil that is staying in the third connection passage 82 of the drain head portion 76, which passage is in fluid communication with the inside of the inflow-restriction plate 74. As a result, the leaked oil in the drain oil passage 53, which is located upstream to the drain filter 70 as shown in FIG. 3, is drawn to and cleaned by the drain filter 70. Then, this cleaned oil flows through the second connection passage 81 and the third connection passage 82 to the third connection passage 89 of the return filter 60 as shown in FIG. 4B and then returns through the downstream tank oil passage 51b to the tank T.

In this way, because of the aspirator structure 90 provided at the junction of the tank oil passage 51 and the drain oil passage 53, the oil that has leaked from the hydraulic pump P, the travel motors MR and ML and the swivel motor MT is cleaned by the drain filter 70 and returned together with the cleaned discharged oil to the tank T. In the above described hydraulic oil filtration apparatus 40, because the leaked oil that has been cleaned by the drain filter 70 flows through the downstream tank oil passage 51b, there is no need to provide a passage or piping specialized only for returning the cleaned leaked oil to the tank T. This is advantageous in reducing the manufacturing cost of the hydraulic oil filtration apparatus 40.

Furthermore, the hydraulic oil filtration apparatus 40 enables a worker to replace the drain filter element 73 and the return filter element 65 at the same or one location when these elements are to be replaced because the drain head portion 76 and the return head portion 67 are a unified component. In the replacement work, the drain casing 71 is removed from the drain head portion 76, and the drain casing 71 and the drain filter element 73 are replaced. Also, the return casing 63 is removed from the return head portion 67, and the return casing 63 and the return filter element 65 are replaced. Unlike a conventional hydraulic oil filtration apparatus, in which the drain filter 70 and the return filter 60 are installed at different and separate locations, the hydraulic oil filtration apparatus 40 according to the present invention improves the efficiency of the filter-element replacement work significantly.

Figure 6:
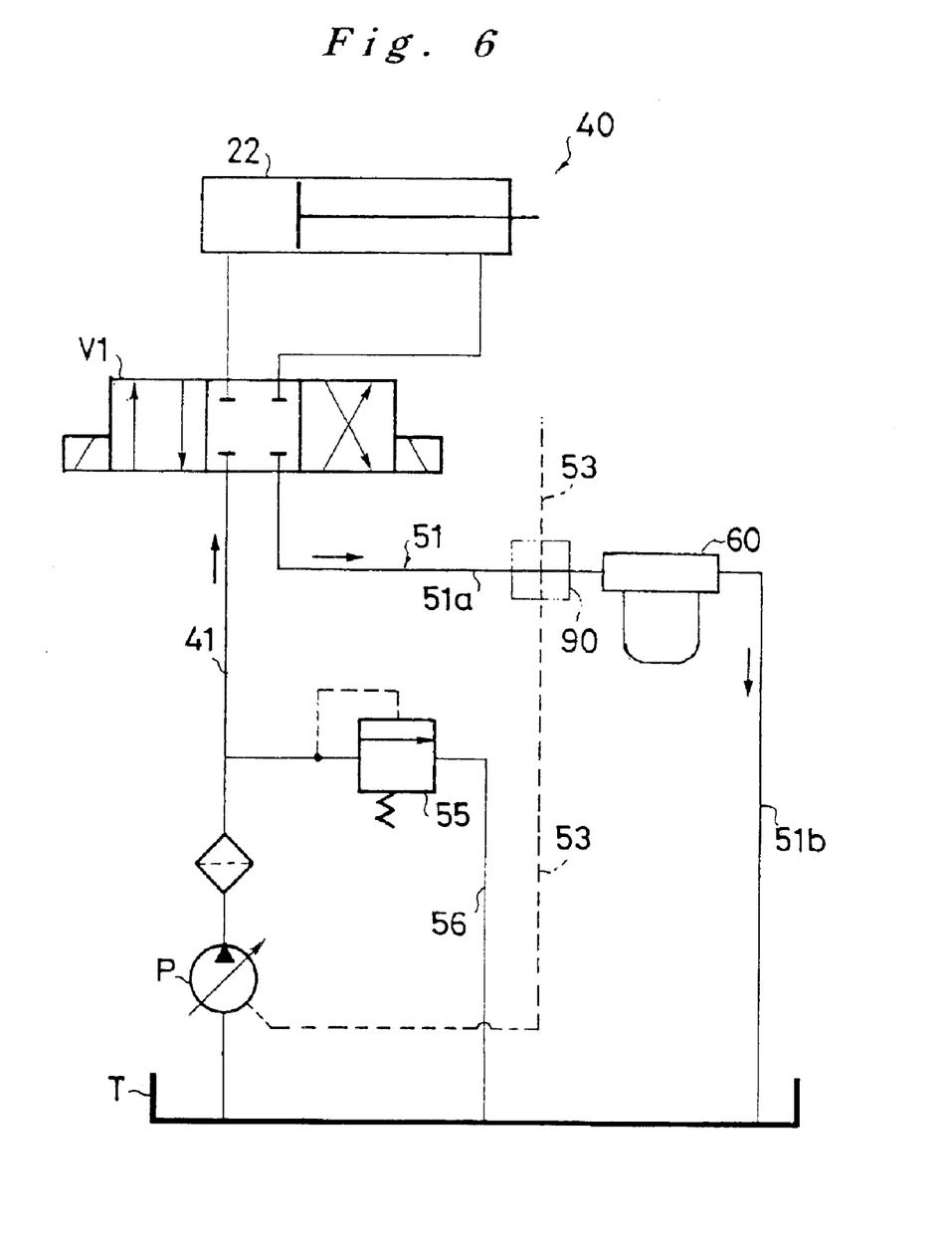
FIG. 6 is a hydraulic circuit diagram of a hydraulic oil filtration apparatus as an embodiment according to the present invention.

The above embodiment of hydraulic oil filtration apparatus 40 comprises two filters (the drain filter 70 and the return filter 60). However, the hydraulic oil filtration apparatus 40 may comprise only one filter (the return filter 60) as shown in FIG. 6. In this case, the return filter 60 is provided in the tank oil passage 51 of the hydraulic oil filtration apparatus 40, and the drain oil passage 53 is connected with the upstream part 51a of the tank oil passage 51, which part is located upstream with respect to the return filter 60, and the aspirator structure 90 shown in FIG. 5 is provided at the junction between the upstream tank oil passage 51a and the drain oil passage 53. The aspirator structure 90 functions to draw the leaked oil in the drain oil passage 53 into the upstream tank oil passage 51a when the discharged oil flows through the upstream tank oil passage 51a. As a result, the discharged oil flowing through the upstream tank oil passage 51a and the leaked oil flowing through the drain oil passage 53 are combined to flow together into the return filter 60 for cleaning before returning through the downstream tank oil passage 51b to the tank T. By arranging the filtration apparatus with only one filter in this way, the drain filter 70 shown in FIG. 2, which is used for cleaning only the leaked oil, is made unnecessary to further reduce the manufacturing cost of the hydraulic oil filtration apparatus 40.

In a hydraulic oil filtration apparatus according to the present invention, a drain oil passage is provided to connect at least one of the hydraulic pump and the hydraulic actuator to a tank oil passage that is located downstream to a first filter, and a second filter is provided in the drain oil passage. In addition, an aspirator structure is provided at the junction between the tank oil passage and the drain oil passage, so that when the oil discharged from the hydraulic actuator is flowing to the tank oil passage, leaked oil in the drain oil passage is drawn and led to the second filter by this flow of the discharged oil. As a result, the oil discharged from the hydraulic actuator is cleaned by the first filter while the oil leaked from the hydraulic pump and the hydraulic actuator is cleaned by the second filter. Then, the cleaned leaked and discharged oil together flows into the tank oil passage and returns to the tank. Therefore, it is not necessary to provide a passage or piping specialized only for returning the leaked oil that has been cleaned by the second filter, to the tank. This saves piping material and thereby reduces the manufacturing cost of the hydraulic oil-filtration apparatus.

In another hydraulic oil filtration apparatus according to the present invention, a tank oil passage is provided to connect the hydraulic actuator to the tank, and a filter is provided in the tank oil passage. A drain oil passage is provided to connect at least one of the hydraulic pump and the hydraulic actuator to the tank oil passage at a location upstream with respect to the filter. An aspirator structure is provided at the junction between the tank oil passage and the drain oil passage, so that when the oil discharged from the hydraulic actuator is flowing to the tank oil passage, leaked oil in the drain oil passage is drawn to the tank oil passage by this flow of the discharged oil. As a result, the leaked oil is led to the filter together the discharged oil. In this way, the oil discharged from the hydraulic actuator and the oil leaked from the hydraulic pump and the hydraulic actuator are cleaned together by the single filter. Therefore, it is not necessary to provide a passage or piping specialized for returning only the cleaned leaked oil to the tank, and it is also not necessary to provide a filter specialized for cleaning only the leaked oil. These advantages further reduce the manufacturing cost of the hydraulic oil filtration apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following

What is claimed is:

1. A hydraulic oil filtration apparatus comprising:

a hydraulic apparatus;

a first filter, which filters hydraulic oil discharged from said hydraulic apparatus;

a second filter, which filters hydraulic oil leaked from said hydraulic apparatus;

a first downstream discharge oil passage, which returns tank-ward the hydraulic oil filtered by said first filter;

a second downstream discharge oil passage, which returns tank-ward the hydraulic oil filtered by said second filter;

an aspirator structure, which connects said first downstream discharge oil passage and said second downstream discharge oil passage to join the hydraulic oil discharged from said first filter and the hydraulic oil discharged from said second filter; and a joined discharge oil passage, which returns the hydraulic oil joined by said aspirator structure to a tank;

wherein:

said aspirator structure draws the hydraulic oil flowing in through said second downstream discharge oil passage by the flow of the hydraulic oil flowing in through said first downstream discharge oil passage and joins these flows.

2. The hydraulic oil filtration apparatus as set forth in claim 1, wherein:

said aspirator structure comprises a main oil passage, which leads the hydraulic oil coming in through said first downstream discharge oil passage, and a minor oil passage, which is open toward a downstream side of said main oil passage and, through this opening, leads the hydraulic oil coming in through said second downstream discharge oil passage to flow into said main oil passage; and the hydraulic oil flowing into said minor oil passage is drawn into said main oil passage to join into a unified flow by the flow of the hydraulic oil through said main oil passage.

3. The hydraulic oil filtration apparatus as set forth in claim 1, wherein:

said hydraulic apparatus comprises a hydraulic actuator, a hydraulically actuated device, which is actuated by said hydraulic actuator, a hydraulic pump, which delivers hydraulic oil, and an actuation control valve, which controls to charge and discharge said hydraulic actuator of said hydraulically actuated device with the hydraulic oil delivered by said hydraulic pump; and the oil that has been discharged in the actuation of said hydraulic actuator is filtered by said first filter while the oil that has leaked from at least one of said hydraulic pump and said hydraulic actuator is filtered by said second filter.

4. The hydraulic oil filtration apparatus as set forth in claim 1, wherein:

said first filter comprises a first casing, which is a container with an upper opening, a first filter element, which is accommodated and retained in said first casing, and a first head, which is attached removably to cover the upper opening of said first casing;

said second filter comprises a second casing, which is a container with an upper opening, a second filter element, which is accommodated and retained in said second casing, and a second head, which is attached removably to cover the upper opening of said second casing; and said first head and said second head are constructed as a unified head, in which said aspirator structure is provided.

5. A hydraulic oil filtration apparatus comprising:

a hydraulic apparatus;

a first upstream discharge oil passage, which leads hydraulic oil that has been discharged from said hydraulic apparatus;

a second upstream discharge oil passage, which leads hydraulic oil that has leaked from said hydraulic apparatus;

an aspirator structure, which connects said first upstream discharge oil passage and said second upstream discharge oil passage to join the hydraulic oil discharged from said hydraulic apparatus and the hydraulic oil leaked from said hydraulic apparatus;

a filter, which filters the hydraulic oil that has been joined by said aspirator structure; and a joined discharge oil passage, which returns the hydraulic oil filtered by said filter to a tank;

wherein:

said aspirator structure draws the hydraulic oil flowing in through said second upstream discharge oil passage by the flow of the hydraulic oil flowing in through said first upstream discharge oil passage and joins these flows.

6. The hydraulic oil filtration apparatus as set forth in claim 5, wherein:

said aspirator structure comprises a main oil passage, which leads the hydraulic oil coming in through said first upstream discharge oil passage, and a minor oil passage, which is open toward a downstream side of said main oil passage and, through this opening, leads the hydraulic oil coming in through said second upstream discharge oil passage to flow into said main oil passage; and the hydraulic oil flowing into said minor oil passage is drawn into said main oil passage by the flow of the hydraulic oil through said main oil passage, joining into a unified flow.

7. The hydraulic oil filtration apparatus as set forth in claim 5, wherein:

said hydraulic apparatus comprises a hydraulic actuator, a hydraulically actuated device, which is actuated by said hydraulic actuator, a hydraulic pump, which delivers hydraulic oil, and an actuation control valve, which controls to charge and discharge said hydraulic actuator of said hydraulically actuated device with the hydraulic oil delivered by said hydraulic pump; and the oil that has been discharged in the actuation of said hydraulic actuator is led into said first upstream discharge oil passage while the oil that has leaked from at least one of said hydraulic pump and said hydraulic actuator is led into said second upstream discharge oil passage.

8. A hydraulic oil filtration apparatus comprising:

a hydraulic apparatus which discharges hydraulic oil and which leaks hydraulic oil;

a first filter, which filters hydraulic oil discharged from said hydraulic apparatus;

a second filter, which filters hydraulic oil leaked from said hydraulic apparatus;

an oil passage connected between said hydraulic apparatus and said first filter for conveying hydraulic oil discharged from said hydraulic apparatus to said first filter;

an oil passage connected between said hydraulic apparatus and said second filter for conveying hydraulic oil leaked from said hydraulic apparatus to said second filter;

an oil tank;

a first downstream discharge oil passage extending tank-ward from said first filter, which returns tank-ward the hydraulic oil filtered by said first filter;

a second downstream discharge oil passage passage extending tank-ward from said second filter, which returns tank-ward the hydraulic oil filtered by said second filter;

an aspirator structure, which connects said first downstream discharge oil passage with said second downstream discharge oil passage and combines the hydraulic oil discharged from said first filter and the hydraulic oil discharged from said second filter into a common stream as a result of the hydraulic oil flowing in through said first downstream discharge oil passage sucking in the hydraulic oil flowing in through said second downstream discharge oil passage; and a combined discharge oil passage extending tank-ward from said aspirator structure, which returns the hydraulic oil combined by said aspirator structure to the oil tank.

* * * * *